United States Patent
Toyama et al.

(10) Patent No.: US 9,150,191 B2
(45) Date of Patent: Oct. 6, 2015

(54) THROUGH ANCHOR (71) Applicant: KABUSHIKI KAISHA TOKAI-RIKA-DENKI-SEISAKUSHO, Aichi-ken (JP)

(72) Inventors: Hiroyuki Toyama, Aichi-ken (JP); Takahiro Hamada, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 14/249,423

(22) Filed: Apr. 10, 2014

(65) Prior Publication Data
US 2014/0306436 A1    Oct. 16, 2014

(30) Foreign Application Priority Data

Apr. 12, 2013  (JP) ................................ 2013-084173

(51) Int. Cl.
*B60R 22/24*    (2006.01)
*B60R 22/18*    (2006.01)

(52) U.S. Cl.
CPC ......... *B60R 22/24* (2013.01); *B60R 2022/1818* (2013.01)

(58) Field of Classification Search
CPC ............................... B60R 22/18; B60R 22/24
USPC ................. 280/801.1, 801.2, 808; 242/615.3; 297/468, 483
See application file for complete search history.

(56) References Cited

U.S. PATENT DOCUMENTS

| | | | | |
|---|---|---|---|---|
| 6,382,672 B1* | 5/2002 | Minami et al. | ............. | 280/801.1 |
| 6,688,647 B2* | 2/2004 | Koketsu | ......................... | 280/808 |
| 6,739,625 B2* | 5/2004 | Tomita et al. | ................. | 280/808 |
| 7,578,525 B2* | 8/2009 | You | .............................. | 280/808 |
| 7,591,512 B2* | 9/2009 | You | .............................. | 297/482 |
| 7,600,786 B2* | 10/2009 | You | .............................. | 280/808 |
| 7,964,130 B2* | 6/2011 | You | .............................. | 264/254 |
| 2001/0014997 A1* | 8/2001 | Suzuki et al. | ............... | 24/265 R |
| 2001/0043006 A1* | 11/2001 | Iseki | ........................ | 297/463.1 |

(Continued)

FOREIGN PATENT DOCUMENTS

| | | |
|---|---|---|
| DE | 10040967 | 3/2001 |
| EP | 1621417 | 2/2006 |

(Continued)

OTHER PUBLICATIONS

European Search Report Application No. 14164357.7-1503 dated May 30, 2014.
Japanese Office Action dated Feb. 24, 2015 and English translation of Notice of Reasons for Rejection.

*Primary Examiner* — James English
(74) *Attorney, Agent, or Firm* — Roberts Mlotkowski Safran & Cole P.C.

(57) ABSTRACT

In a through anchor, a side face on a piece side of a groove portion is configured by a piece side inclined face, with the piece side inclined face being inclined in a direction such that an angle formed between the piece side inclined face and a slide face of the piece is an obtuse angle. During molding of a molded portion, an apex portion of a rib of a mold is disposed on or abuts the piece side inclined face of the piece. Movement of the piece in a length direction thereof is accordingly suppressed by the rib of the mold. The molded portion can accordingly be molded with the piece in a well-positioned state by injecting a resin material for the molded portion into the mold in this state.

7 Claims, 11 Drawing Sheets

(56) References Cited

U.S. PATENT DOCUMENTS

| | | | |
|---|---|---|---|
| 2002/0093185 A1* | 7/2002 | Koketsu | 280/801.1 |
| 2003/0020271 A1* | 1/2003 | Okubo | 280/808 |
| 2004/0227341 A1* | 11/2004 | Hattori | 280/801.1 |
| 2014/0070596 A1* | 3/2014 | Tabata et al. | 297/474 |

FOREIGN PATENT DOCUMENTS

| | | |
|---|---|---|
| JP | 2001-347920 | 12/2001 |
| JP | 2002-103386 | 4/2002 |
| JP | 2005-305868 | 11/2005 |
| JP | 2011056968 | 3/2011 |

\* cited by examiner

THROUGH ANCHOR

CROSS-REFERENCE TO RELATED APPLICATION

This application claims priority under 35 USC 119 from Japanese Patent Application No. 2013-084173 filed Apr. 12, 2013, the disclosure of which is incorporated by reference herein.

BACKGROUND

1. Field of the Invention

The present invention relates to a through anchor through which occupant restraint webbing is inserted.

2. Related Art

In a seatbelt guide anchor (through anchor) described in Japanese Patent Application Laid-Open (JP-A) No. 2002-103386, a guide piece (piece) is assembled to a guide plate (main body portion), and the guide piece and the guide plate are insert molded with a mold resin. A guide piece outer peripheral groove is formed at a boundary portion between the guide piece and the mold resin, and the guide piece outer peripheral groove extending around the entirety of an outer peripheral edge of the guide piece. A mold used to form the mold resin is provided with a rib for forming groove that forms the guide piece outer peripheral groove, and clearance is provided between this groove forming rib and the outer peripheral edge of the guide piece. The (groove forming rib of the) mold is accordingly suppressed from interference (impinging) on the guide piece when forming the resin molding, thereby preventing the scratches and dents from occurring in the guide piece. Note that a through anchor is also described in JP-A No. 2011-56968.

However, since in the seatbelt guide anchor described above, the clearance is provided between the (groove forming rib of the) mold and the outer peripheral edge of the guide piece, there is therefore a possibility of positional displacement of the guide piece in the guide piece length direction during molding of the mold resin. An issue accordingly arises of being unable to position the guide piece well during molding of the mold resin.

SUMMARY

In consideration of the above circumstances, the present invention is to provide a through anchor that enables good positioning of a piece when molding a covering portion.

A through anchor of a first aspect includes: a main body portion that is manufactured from metal, and at which a through hole, which is for forming an insertion hole through which a webbing that restrains an occupant is inserted, is formed; a piece that is assembled to the main body portion so as to cover a portion of an inner peripheral edge portion of the through hole, and whose face configures a slide contact portion that makes sliding contact with the webbing; a covering portion that is formed by molding integrally with the piece and the main body portion with the slide contact portion being in an exposed state, that covers another portion of the inner peripheral edge portion of the through hole, and that configures an inner peripheral portion of the insertion hole together with the piece; a groove portion that is formed at a boundary portion between the piece and the covering portion; and a piece side inclined face that configures a side face of the groove portion at the piece side, with an angle formed between the piece side inclined face and the slide contact portion being set as an obtuse angle as viewed in a cross-section orthogonal to the groove portion.

In the through anchor of the first aspect, the through hole that is used to form an insertion hole through which the webbing is inserted is formed in the main body portion. The piece is assembled to the main body portion so as to cover a portion of the inner peripheral edge portion of the through hole, and the front face of the piece configures the slide contact portion that makes sliding contact with the webbing. The covering portion is formed by molding integrally with the piece and the main body portion such that the slide contact portion of the piece is in an exposed state, with the covering portion covering the other portion of the inner peripheral edge portion of the through hole. The inner peripheral portion of the insertion hole is accordingly configured by the piece and the covering portion.

The groove portion is formed at the boundary portion between the piece and the covering portion. Moreover, the side face of the groove portion on the piece side configures the piece side inclined face, and the angle formed between the piece side inclined face and the slide contact portion set as an obtuse angle as viewed in a cross-section orthogonal to the groove portion (as viewed along the groove portion length direction (the groove extending direction)). Movement of the piece can accordingly be suppressed by abutting the mold used to form the groove portion against the piece side inclined face. Good positioning of the piece is therefore enabled during molding of the covering portion.

A through anchor of a second aspect is the through anchor of the first aspect, further including: a covering portion side inclined face that configures a side face of the groove portion at the covering portion side, with an angle formed between the covering portion side inclined face and a face of the covering portion being set as an obtuse angle as viewed in the cross-section orthogonal to the groove portion.

In the through anchor of the second aspect, the side face of the groove portion on the covering portion side is configured as the covering portion side inclined face, and the angle formed between the covering portion side inclined face and the face of the covering portion is set as an obtuse angle as viewed in a cross-section orthogonal to the groove portion (as viewed along the groove portion length direction). The cross-section profile of the groove portion can accordingly be formed in a V-shape, for example. Sliding resistance with the webbing as the webbing slides over the inner peripheral portion of the insertion hole can accordingly be made smaller than when, for example, a groove portion is formed with, for example, a rectangle-shaped or U-shaped recessed cross-section profile.

According to the through anchor of the first aspect, good positioning of the piece is enabled during molding of the covering portion.

According to the through anchor of the second aspect, sliding resistance with the webbing can be reduced when the webbing slides over the inner peripheral portion of the insertion hole.

Next, explanation of a third aspect and a fourth aspect of the present invention is given paying attention to the shape of the piece to reduce the pulling force of the webbing.

A piece is assembled to a metal main body portion, and the piece and the main body portion are molded integrally to a covering portion in a through anchor. An inner peripheral portion of an insertion hole through which webbing is inserted is configured by the covering portion and the piece, and the piece portion is configured from a material with a lower frictional resistance than the covering portion. When an occupant pulls out the webbing, the webbing is pulled out while sliding over the piece.

However, when the occupant pulls out the webbing toward the vehicle front side, the through anchor tilts by about 45° toward the vehicle front side, and the webbing extends out from the insertion hole of the through anchor toward the vehicle front side. When this occurs, there is a possibility of the webbing contacting the covering portion configuring length direction end portion of the insertion hole.

As a countermeasure, extending the piece toward the outer side in the length direction of the insertion hole enables the webbing that is being pulled out toward the vehicle front side to be suppressed from contacting the covering portion. However, even in such a case, if a surface area over which the webbing slides is small, there can be issues with the webbing contacting the covering portion, increasing the pulling force of the webbing.

In consideration of the above circumstances, the third and the fourth aspects are to provide a through anchor capable of reducing the pulling force of the webbing even when the webbing is pulled out toward the vehicle front side.

A through anchor of the third aspect including: a main body portion that is manufactured from metal, and at which a through hole, which is for forming an insertion hole through which a webbing that restrains an occupant is inserted, is formed; a piece that is assembled to the main body portion so as to cover an inner peripheral edge portion of the through hole, that, in an assembled state to a vehicle, configures a lower portion and a vehicle front side end portion of an inner peripheral portion of the insertion hole, and that curves towards an upper side at the vehicle front side end portion; and a covering portion that is formed by molding integrally with the piece and the main body portion, that covers another portion of the inner peripheral edge portion of the through hole, and that configures an inner peripheral portion of the insertion hole together with the piece; wherein during assembly of the piece to the main body portion, the piece is assembled to the main body portion by disposing the piece inside the through hole and moving the piece toward a vehicle front side and a vehicle lower side.

The through anchor of the fourth aspect is the through anchor of the third aspect, wherein a length along a longitudinal direction of the insertion hole from an inner peripheral face of the insertion hole at a vehicle rear side to an end of the piece at the vehicle front side is set at, or greater than, a value of a width dimension of the webbing multiplied by √2.

According to the third aspect, the vehicle front side end portion of the inner peripheral portion of the insertion hole is configured by the piece, and the vehicle front side end portion of the piece is curved toward the upper side. When the occupant pulls out the webbing toward the vehicle front side, the through anchor tilts by about 45° toward the vehicle front side and the webbing extends out from the insertion hole of the through anchor toward the vehicle front. The pulling force of the webbing can accordingly be reduced since a width direction edge portion of the webbing contacts the piece even when the occupant pulls out the webbing toward the vehicle front side.

Note that during assembly of the piece to the main body portion, the piece is disposed inside the through hole, and from this state the piece is assembled by moving toward the vehicle front side and the lower side. The cross-section of the vehicle front side end portion of the piece is accordingly configured with a shape that is so as to cover the inner peripheral edge portion of the through hole, such that the vehicle front side end portion of the piece can be fitted together with the inner peripheral edge portion of the through hole. The surface area over which the webbing slides at the vehicle front side end portion of the piece can accordingly be set larger. As a result, the pulling force of the webbing when the pulling out the webbing toward the vehicle front side can be effectively reduced.

According to the fourth aspect, the length along the insertion hole length direction from the vehicle rear side inner peripheral face of the insertion hole to the vehicle front side end of the piece is set at, or greater than, the value of the width dimension of the webbing multiplied by √2. The pulling force of the webbing when pulling out the webbing toward the vehicle front side can accordingly be effectively reduced. Namely, as described above, when the occupant pulls out the webbing toward the vehicle front side, the through anchor tilts by about 45° toward the vehicle front side and the webbing extends out from the insertion hole of the through anchor toward the vehicle front. The dimension of the webbing that slides over the piece therefore becomes a value of the webbing width dimension multiplied by √2. Due the length in the insertion hole length direction from the vehicle rear side inner peripheral face of the insertion hole to the vehicle front side end of the piece being set at, or greater than, the value of the width dimension of the webbing multiplied by √2, the webbing is able to slide reliably over the piece even when the webbing is pulled out toward the vehicle front side.

Next, explanation of a fifth aspect of the present invention is given paying attention the shape of the piece regarding load acting on the piece from the webbing.

A piece is assembled to a metal main body portion, and the piece and the main body portion are molded integrally to a covering portion made from a resin material in a through anchor. An inner peripheral portion of an insertion hole of the through anchor is configured by the covering portion and the piece, and the piece portion is configured from a material with a lower frictional resistance than the covering portion. When an occupant pulls out the webbing, the webbing is pulled out while sliding over the piece.

However, when the occupant pulls out the webbing toward the vehicle front side, the through anchor tilts by about 45° toward the vehicle front side, and the webbing extends out from the insertion hole of the through anchor toward the vehicle front side. When this occurs, there is a possibility of the webbing contacting the covering portion configuring an end portion in the length direction of the insertion hole.

As a countermeasure, extending the piece toward the outer side in the length direction of the insertion hole enables the webbing that is being pulled out toward the vehicle front side to be suppressed from contacting the covering portion. In such a configuration, a structure that secures strength of the piece even at whose extended portion is desirable.

In consideration of the above circumstances, the fifth aspect is to provide a through anchor capable of reducing the pulling force of the webbing even when the webbing is pulled out toward the vehicle front side, and that is also capable of securing strength of the piece.

A through anchor of the fifth aspect including: a main body portion that is manufactured from metal, and at which a through hole, which is for forming an insertion hole through which a webbing that restrains an occupant is inserted, is formed; a piece that is assembled to the main body portion by fitting together with an inner peripheral edge portion of the through hole in a close contact state with the inner peripheral edge portion, that, in an assembled state to a vehicle, configures a lower portion and a vehicle front side end portion of an inner peripheral portion of the insertion hole, and that curves towards an upper side at the vehicle front side end portion.

According to the fifth aspect, the vehicle front side end portion of the inner peripheral portion of the insertion hole is configured by the piece, and the vehicle front side end portion of the piece curves (around) toward the upper side. When the occupant pulls out the webbing toward the vehicle front side, the through anchor tilts by about 45° toward the vehicle front side and the webbing extends out from the insertion hole of the through anchor toward the vehicle front side. The pulling force of the webbing can be reduced even when the occupant pulls out the webbing toward the vehicle front side due to the width direction edge portion of the webbing contacting the piece.

The piece is fitted together with the inner peripheral edge portion of the through hole of the main body portion and assembled to the main body portion in a close contact state of the inner peripheral portion of the through hole with the piece. Accordingly, load acting on the piece from the webbing is directly transmitted to the main body portion when the webbing slides over the piece, so enabling (flexing) deformation of the piece due to the load to be suppressed by the main body portion. The strength of the piece can accordingly be secured by the main body portion.

BRIEF DESCRIPTION OF THE DRAWINGS

Embodiments of the invention will be described in detail with reference to the following figures, wherein.

DETAILED DESCRIPTION

Explanation follows regarding a through anchor 10 according to an exemplary embodiment, with reference to the drawings. Note that the arrows shown as appropriate in the drawings indicate directions in an attached state of the through anchor 10 to a vehicle (automobile), and the arrow FR indicates the vehicle front side, the arrow IN indicates the vehicle compartment inside, and the arrow UP indicates the upper side.

Figure 2:
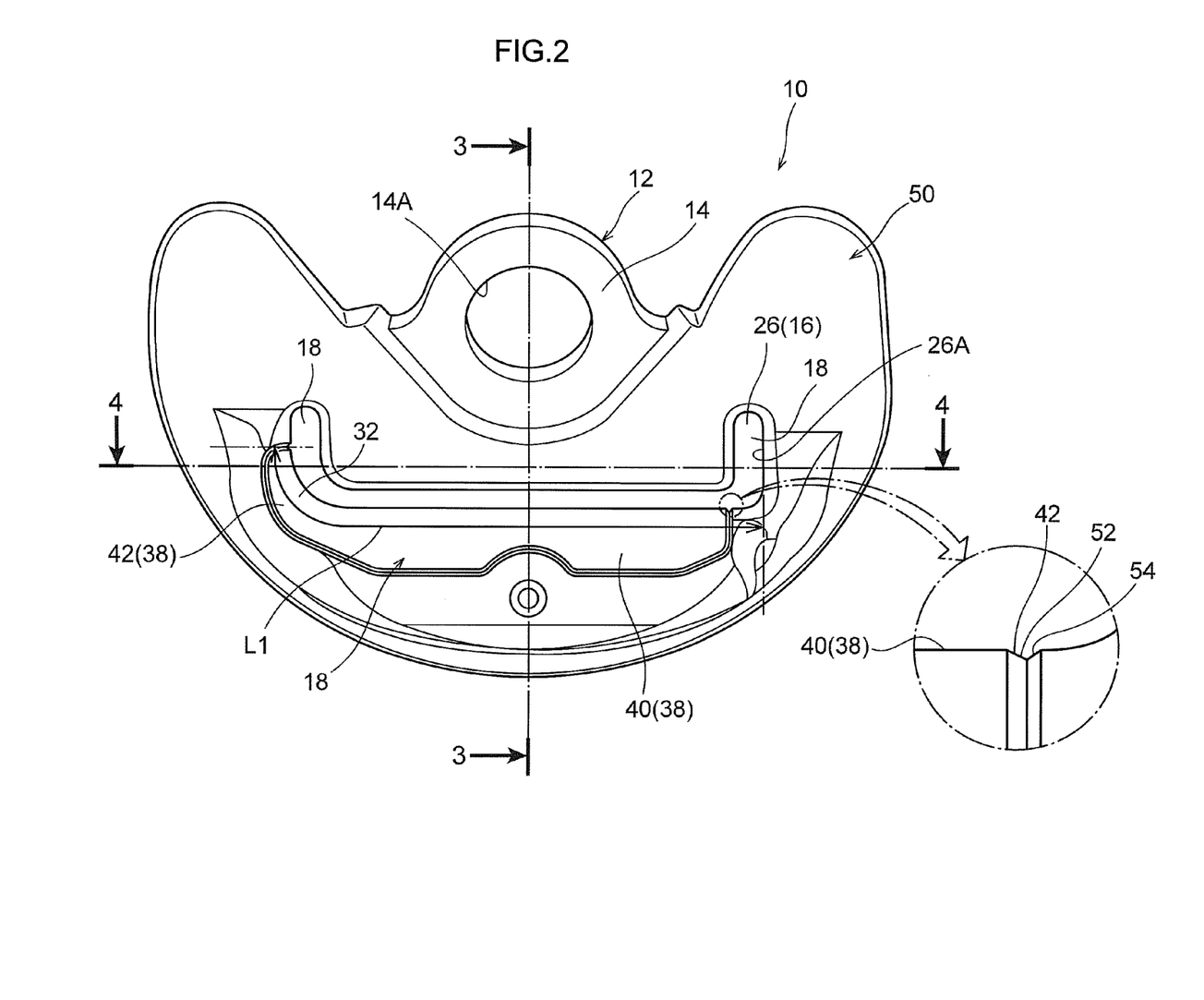
FIG. 2 is a face-on view of the overall through anchor illustrated in FIG. 1, as viewed from a vehicle compartment inside.
Figure 3:
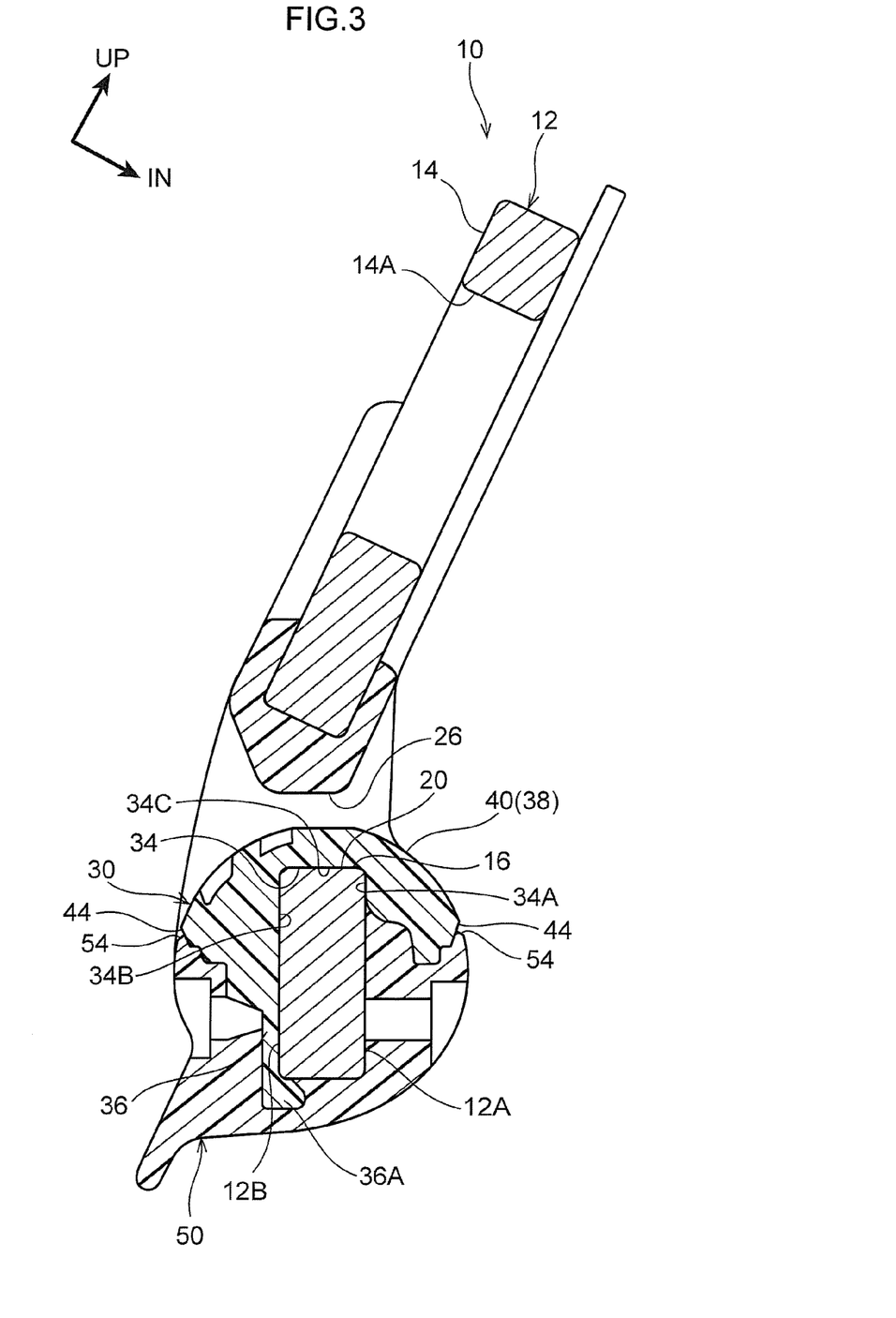
FIG. 3 is a side cross-section (a cross-section taken along line 3-3 in FIG. 2) illustrating the through anchor shown in FIG. 2, as viewed from the vehicle front side.
Figure 4:
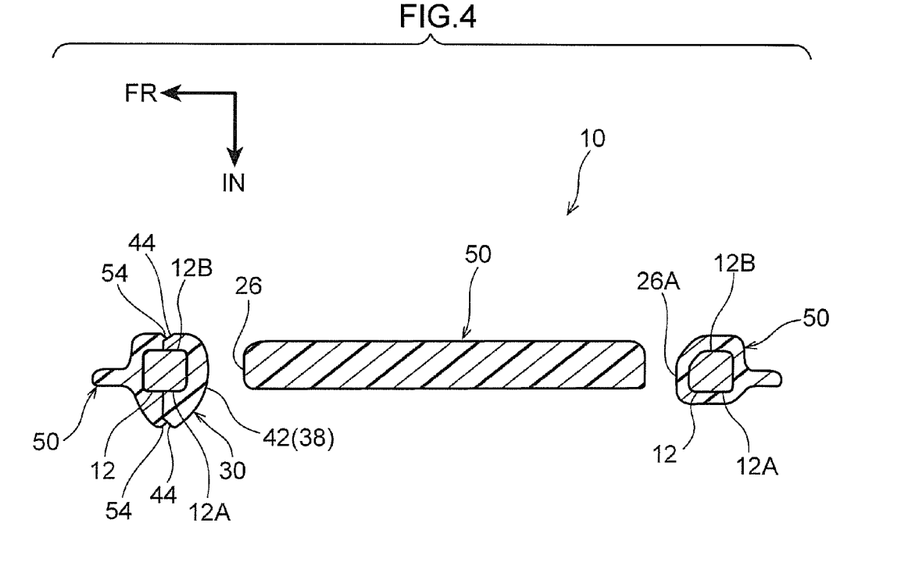
FIG. 4 is a cross-section (a cross-section taken along line 4-4 in FIG. 2) illustrating the through anchor shown in FIG. 2, as viewed from the upper side.

The through anchor 10 is applied to a vehicle seatbelt device. As illustrated in FIG. 2 to FIG. 4, the through anchor 10 is configured including a plate 12 that configures a core portion of the through anchor 10 and serves as a main body portion, a piece 30 that is assembled to the plate 12, and a molded portion 50 that is formed by integrally molding with the plate 12 and the piece 30, and that serves as a covering portion. Explanation follows regarding respective configurations thereof.

Figure 5:
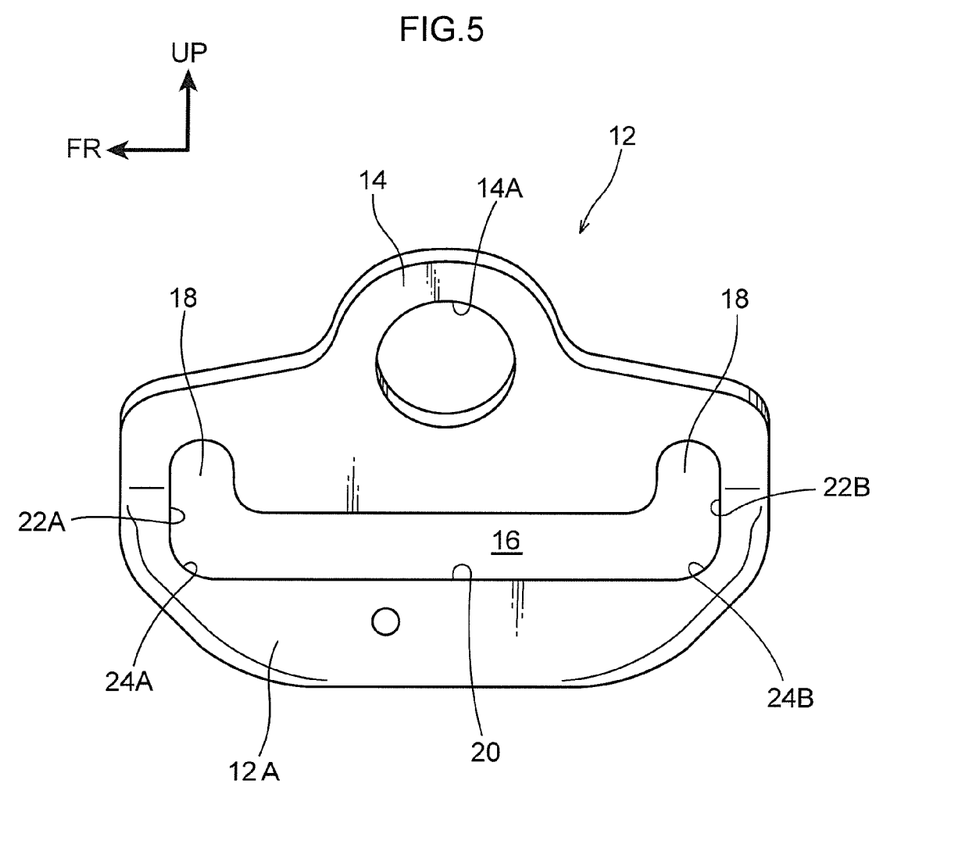
FIG. 5 is a face-on view illustrating a plate employed in the through anchor shown in FIG. 2.

As illustrated in FIG. 5, the plate 12 is manufactured from a metal plate (sheet metal), and is substantially formed in an inverted T-shape. A width direction central portion of an upper portion of the plate 12 configures an attachment portion 14, and the attachment portion 14 is penetrated by a circular shaped attachment hole 14A. An attachment bolt (not shown in the drawings) is inserted through the attachment hole 14A, such that the attachment portion 14 is attached by the attachment bolt rotatably to a vehicle center pillar either directly or through another member. The through anchor 10 is thereby configured so as to be capable of rotating about the attachment hole 14A. The plate 12 is bent at an up-down direction intermediate portion such that a lower side portion of the plate 12 projects out toward the vehicle compartment inside (see FIG. 3).

A substantially central portion of the plate 12 is formed with a through hole 16. The through hole 16 is configured so as to form an insertion hole 26 through which an occupant restraint webbing 70 (see FIG. 10) is inserted. The through hole 16 extends along the plate 12 width direction (the vehicle front-rear direction), and both length direction end portions of the through hole 16 rise up vertically toward the upper side. The through hole 16 is formed with left and right symmetry in the plate 12 width direction, and both length direction end portions of the through hole 16 configure respective through hole side upright portions 18.

A lower side portion of an inner peripheral face of the through hole 16 configures a lower side inner peripheral face 20. Width direction outside portions of inner peripheral faces of the through hole side upright portions 18 configure respective upright inner peripheral faces 22A, 22B, and the upright inner peripheral faces 22A, 22B connect smoothly with the lower side inner peripheral face 20 through circular arc shaped rounded corner faces (R faces) 24A, 24B. Note that the reference numeral 22A is allocated to the upright inner peripheral face disposed on the vehicle front side, and the reference numeral 22B is allocated to the upright inner peripheral face disposed on the vehicle rear side. The reference numeral 24A is allocated to the rounded corner face disposed on the vehicle front side, and the reference numeral 24B is allocated to the rounded corner face disposed on the vehicle rear side.

As illustrated in FIG. 6 to FIG. 9, the piece 30 is configured from a synthetic resin material (such as POM) that has lower friction resistance than that of the molded portion 50, described later. The piece 30 is assembled to the plate 12 so as to cover edge portions of the upright inner peripheral face 22A, the rounded corner face 24A and the lower side inner peripheral face 20 of the through hole 16 of the plate 12 (see FIG. 9B). Specifically, the piece 30 is formed in a columnar shape with a cross section profile substantially configuring an inverted U shape, and the piece 30 extends in the through hole 16 length direction (vehicle front-rear direction). One length direction end portion (a vehicle front side end portion) of the piece 30 is bent round vertically toward the upper side (rises upward). A portion of an inner peripheral portion of the insertion hole 26 is accordingly configured by the piece 30. The portion of the piece 30 that stands upward in a curved shape configures a piece side upright portion 32.

Figure 7:
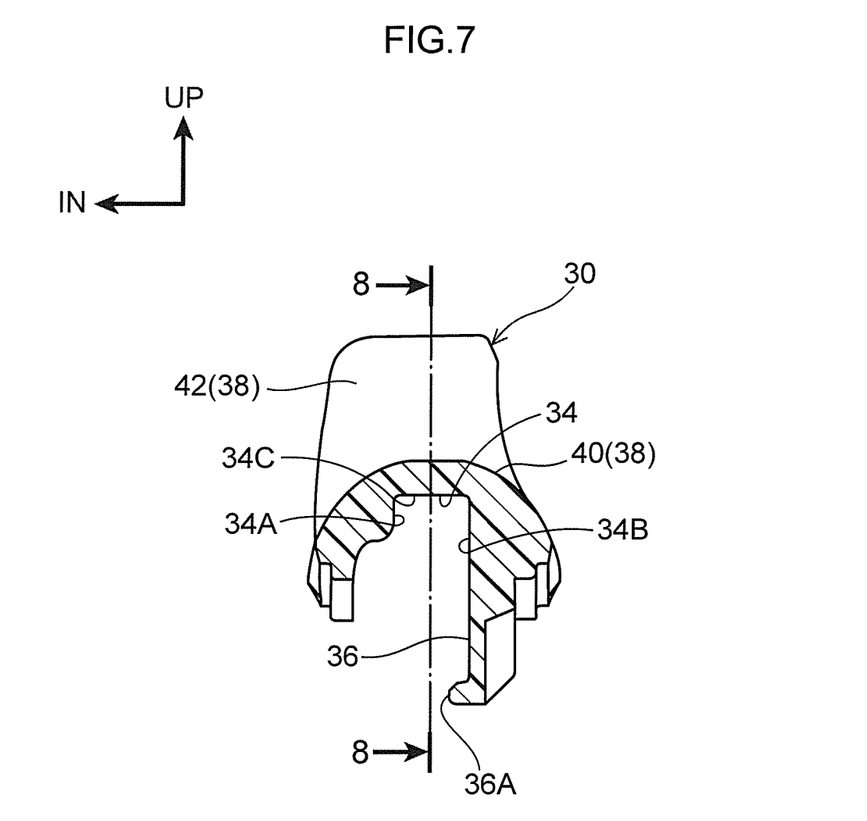
FIG. 7 is a side cross-section illustrating the piece shown in FIG. 6, as viewed from the vehicle rear side.
Figure 8:
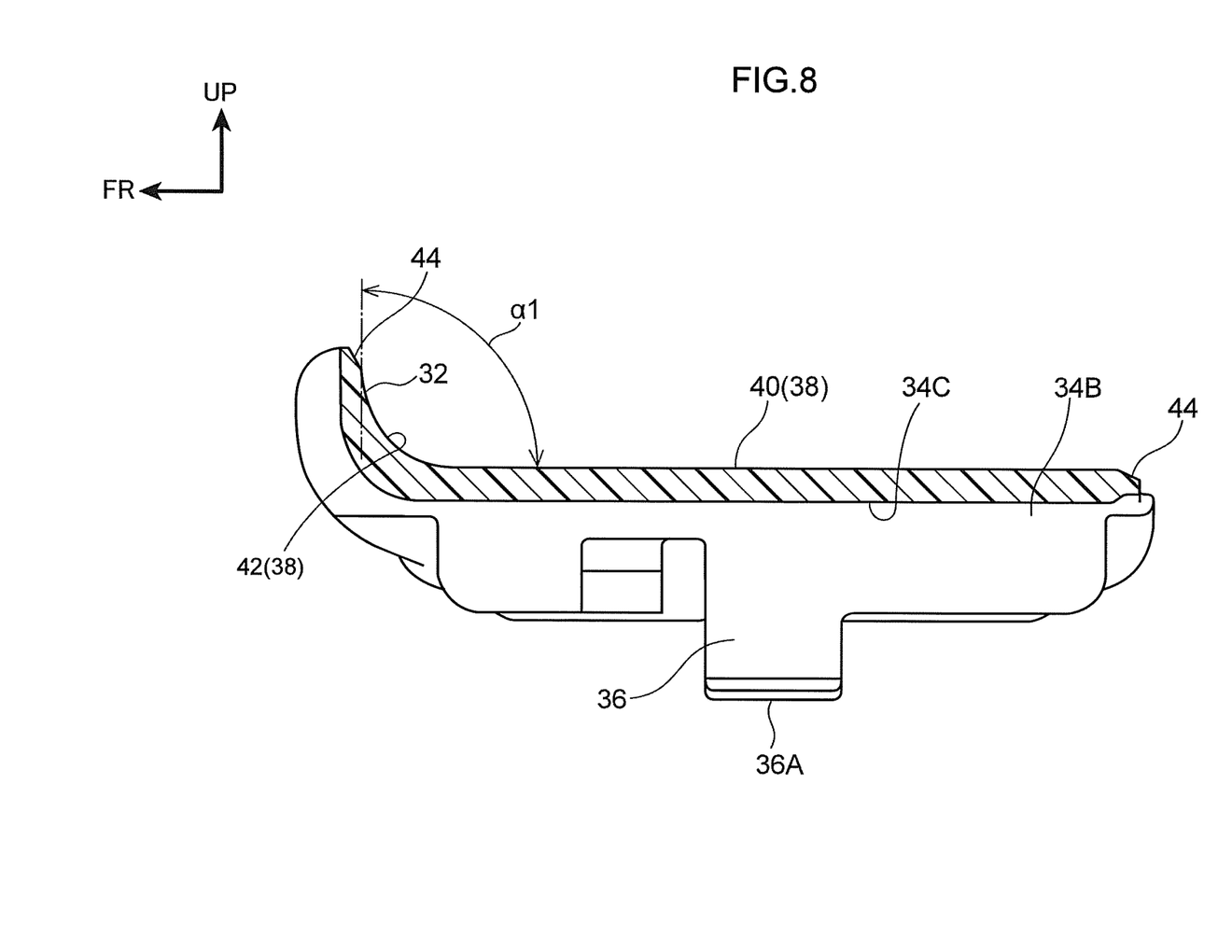
FIG. 8 is a cross-section illustrating the piece shown in FIG. 7, as viewed from the vehicle compartment inside.

As illustrated in FIG. 7, the inside of the piece 30 is formed with a recessed fitting portion 34. The recessed fitting portion 34 is formed in a recessed shape that is open toward the opposite side to the through hole 16 as viewed along the piece 30 length direction, and penetrates the piece 30 in the length direction. The cross-section profile of the recessed fitting portion 34 is set with a constant (uniform) profile along the piece 30 length direction, and an inner peripheral edge portion of the through hole 16 of the plate 12 fits inside the recessed fitting portion 34 in a close contact state. Specifically, as illustrated in FIG. 3, a front face 12A and a back face 12B of the plate 12 respectively make close contact with side faces 34A, 34B of the recessed fitting portion 34, and inner peripheral faces (the lower side inner peripheral face 20, the rounded corner face 24A and the upright inner peripheral face 22A) of the through hole 16 of the plate 12 make close contact with a top face 34C of the recessed fitting portion 34. Accordingly, when the webbing 70 (see FIG. 10) slides over a face (outer face) of the piece 30, load acting on the piece 30 from the webbing 70 is directly transmitted to the plate 12, and (flexing) deformation of the piece 30 due to the load is suppressed by the plate 12. Namely, configuration is made such that the strength of the piece 30 is secured by the plate 12.

As illustrated in FIG. 6 to FIG. 9, an engagement claw 36 is formed at a length direction intermediate portion of the piece 30 on the inside of the piece 30. The engagement claw 36 is integrally formed to a wall portion configuring the side face 34B of the recessed fitting portion 34, and extends toward the lower side. A lower end portion of the engagement claw 36 is formed with a hook portion 36A. The hook portion 36A projects out toward the side wall 34A side of the recessed fitting portion 34 and engages with a lower side outer peripheral portion of the plate 12. Up-down direction movement of the piece 30 with respect to the plate 12 is accordingly restricted.

The face (outer face) of the piece 30 configures a slide face 38 that serves as a slide contact portion. The slide face 38 is configured in a substantially semicircular shape as viewed along the piece 30 length direction, and extends along the piece 30 length direction. The slide face 38 is configured including a first slide face 40 that is disposed along the lower side inner peripheral face 20 of the through hole 16 (along the vehicle front-rear direction), and a second slide face 42 that is disposed corresponding to the piece side upright portion 32. As viewed in the piece 30 length direction, the first slide face 40 is disposed so as to cover the edge portion of the lower side inner peripheral face 20 of the through hole 16, and is formed with uniform curvature along the vehicle front-rear direction. The second slide face 42 is disposed so as to cover an edge portion of the rounded corner face 24A and (a portion of) an edge portion of the upright inner peripheral face 22A of the through hole 16 as viewed along the piece 30 length direction, and a lower end of the second slide face 42 is connected to one length direction end of the first slide face 40. The curvature of the second slide face 42 at a vehicle compartment outside portion of the second slide face 42 is set so as to lessen on progression toward the upper side. Moreover, an angle α1 formed between a tangent line at (contact at) an upper end of the second slide face 42 and the first slide face 40 is set at 90° as viewed face-on from the vehicle compartment inside (see FIG. 6 and FIG. 8).

Figure 9A:
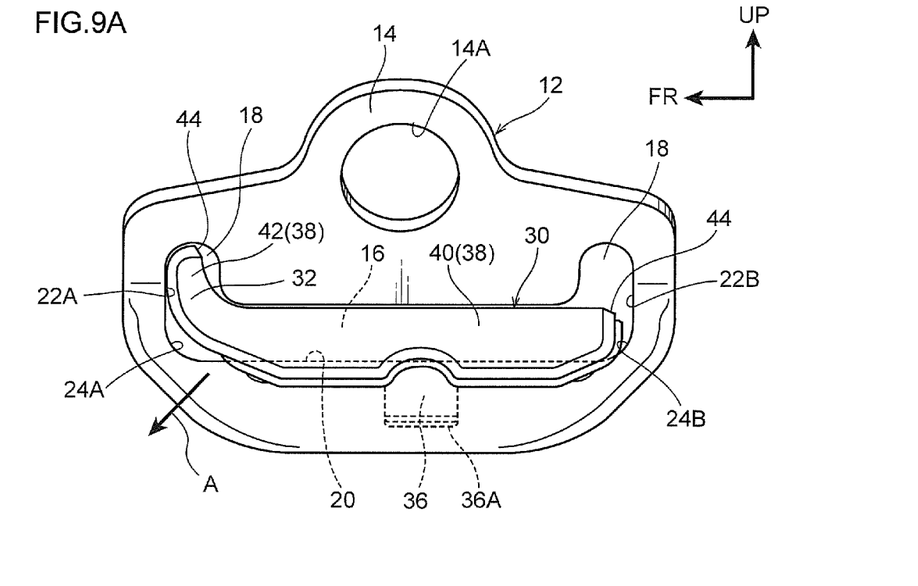
FIG. 9A is a face-on view illustrating a state prior to assembly of a piece to a plate employed in a through anchor.
Figure 9B:
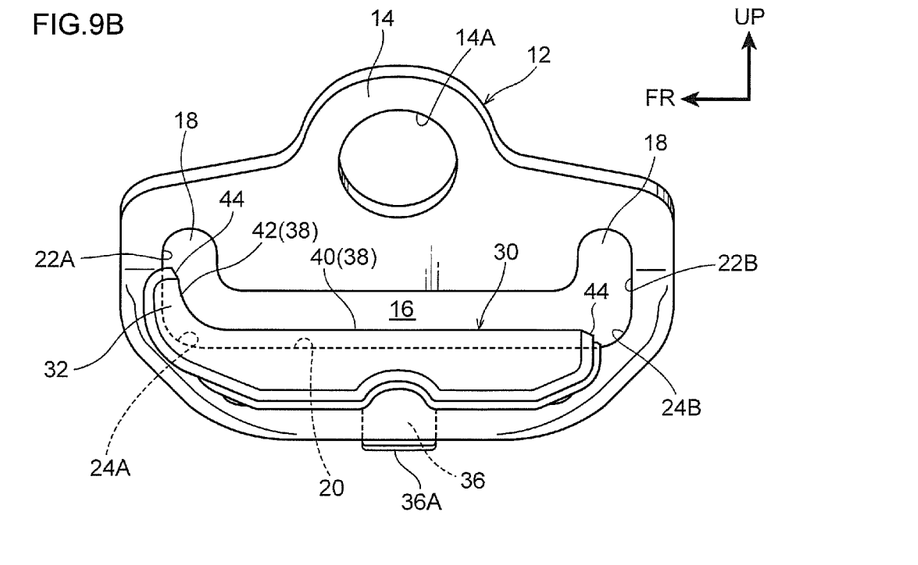
FIG. 9B is a face-on view illustrating a state in which the piece has been moved from the state shown in FIG. 9A and assembled to the plate.

As illustrated in FIG. 9A, during assembly of the piece 30 to the plate 12, the piece 30 is disposed inside the through hole 16 such that the recessed fitting portion 34 of the piece 30 straddles the lower side portion of the plate 12, and in this state the piece 30 is assembled to the plate 12 by moving the piece 30 toward one width direction side (the vehicle front side) of the plate 12 and downwards (in the arrow A direction side in FIG. 9A). As viewed face-on, the external profile of the piece 30 is accordingly set such that the piece side upright portion 32 of the piece 30 falls within the through hole side upright portion 18 on the plate 12 one width direction side of the through hole 16.

Figure 1:
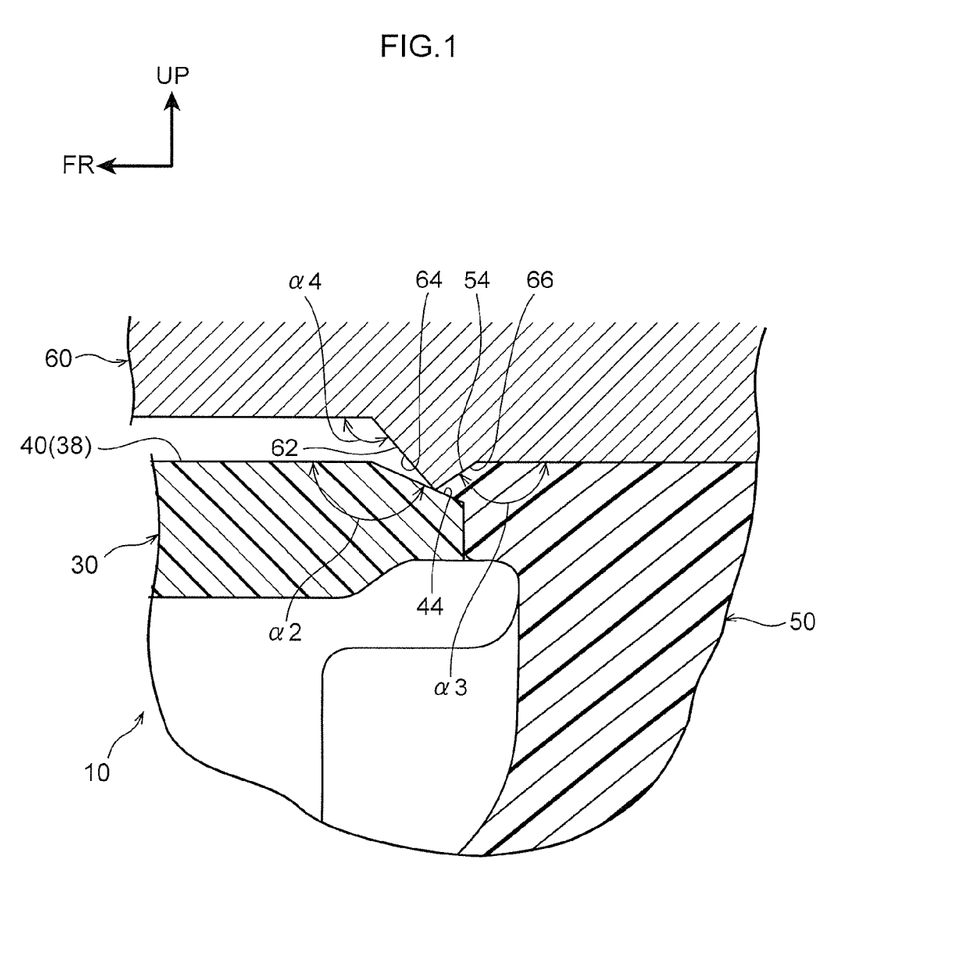
FIG. 1 is a cross-section illustrating a mold used to mold a groove portion of a through anchor according to a present exemplary embodiment, viewed from a direction orthogonal to the groove portion (along the groove portion length direction) (a cross-section corresponding to the portion encircled by a single-dotted intermittent line in FIG. 2)
Figure 6:
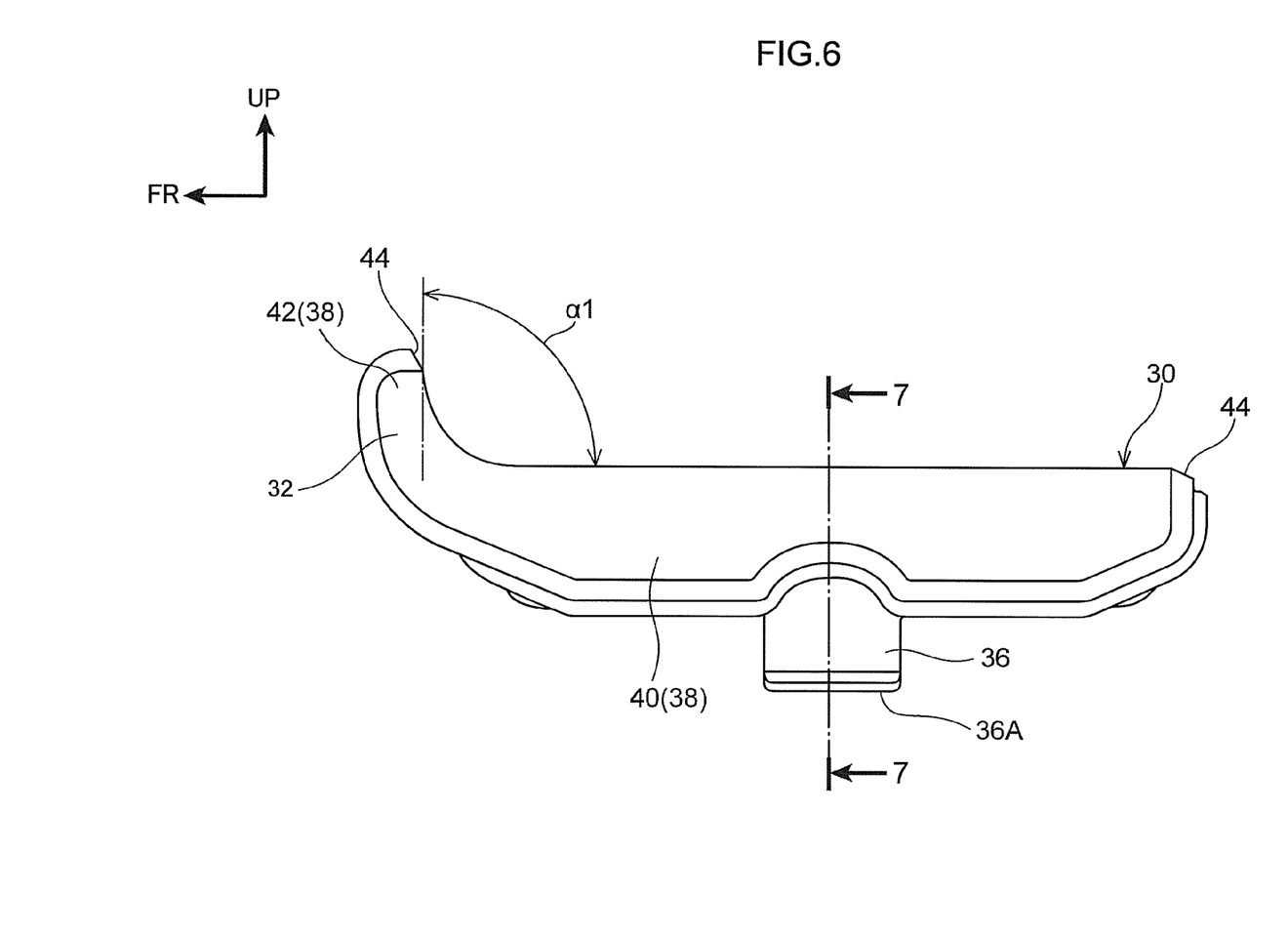
FIG. 6 is a face-on view illustrating a piece employed in the through anchor shown in FIG. 2.

As illustrated in FIG. 6, the entirety of an outer peripheral portion of the piece 30 is formed with a piece side inclined face 44. Namely, a pair of the piece side inclined faces 44 are formed in the piece 30 length direction (see FIG. 8). Moreover, as illustrated in FIG. 1, the incline of the piece side inclined faces 44 is configured such that an angle α2 formed between the piece side inclined face 44 and the slide face 38 adjacent to the piece side inclined face 44 is an obtuse angle as viewed in cross-section from inside the vehicle compartment.

As illustrated in FIG. 2, the molded portion 50 is configured from a synthetic resin material (such as PA). The molded portion 50 is integrally molded with the plate 12 and the piece 30. The overall molded portion 50 is formed in a substantially U-shaped plate shape that is open toward the upper side. In this state, the slide face 38 of the piece 30 is exposed, and portions of the plate 12 other than the attachment portion 14 are covered by the molded portion 50. The inner peripheral portion of the insertion hole 26 is accordingly configured by (the slide face 38 of) the piece 30 and the molded portion 50.

The webbing 70 extends out from a webbing take-up device, not shown in the drawings, toward the upper side, is inserted through the insertion hole 26 from the vehicle compartment outside, is entrained around the slide face 38 of the piece 30 and extends from the insertion hole 26 toward the vehicle compartment inside.

Figure 10:
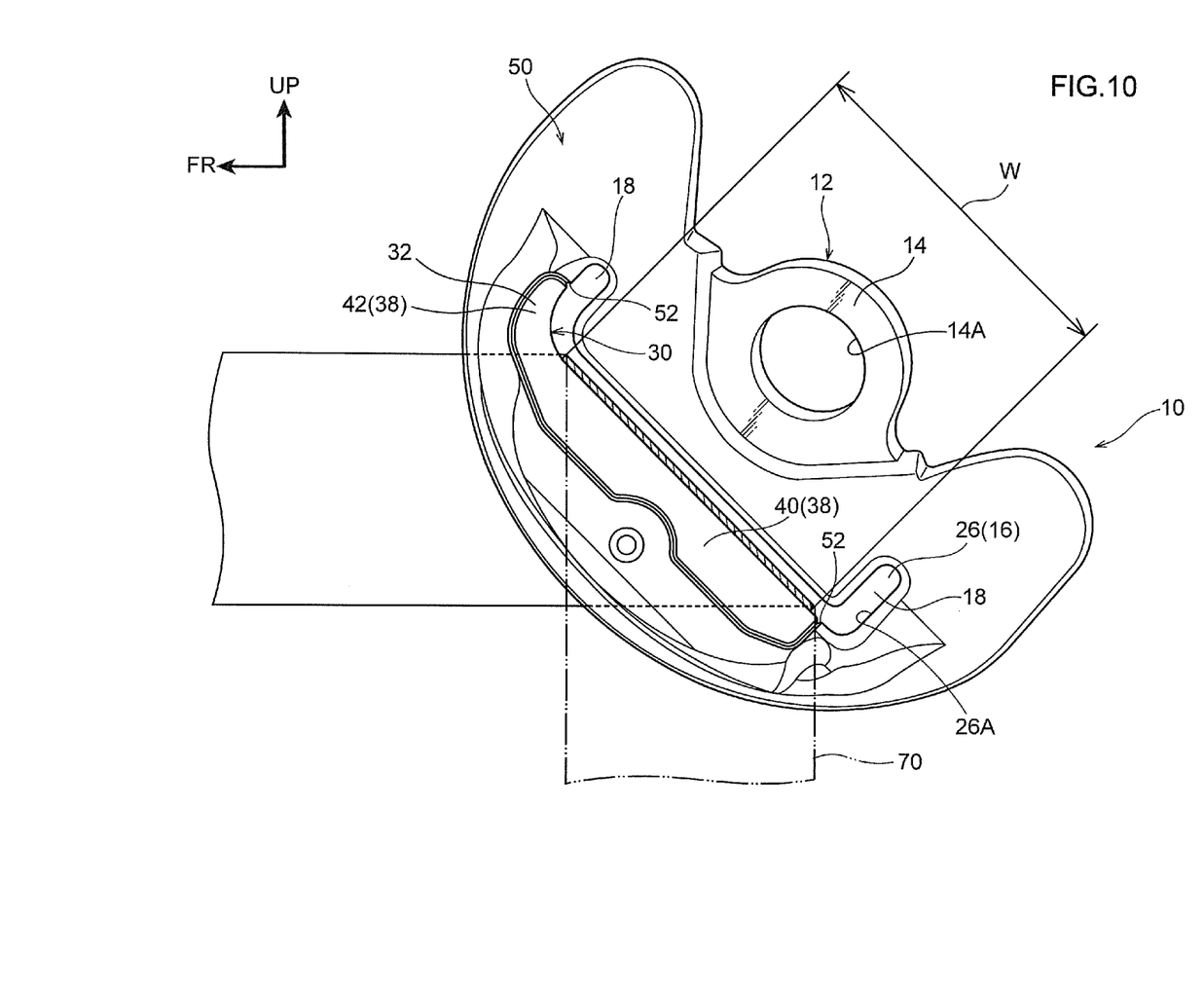
FIG. 10 is a face-on view illustrating a state in which webbing has been pulled out toward the vehicle front side in the through anchor shown in FIG. 2.

As viewed face-on from inside the vehicle compartment, a length L1 along the piece 30 longitudinal (length) direction (and along the inner peripheral direction of the insertion hole 26) from an inner peripheral face 26A on the plate 12, which is at the width direction other end side (vehicle rear side) of the insertion hole 26, to the upper end of the second slide face 42 of the piece 30 is set at, or greater than, a value which the width dimension of the webbing 70 is multiplied by √2 (square root 2). More specifically, as illustrated in FIG. 10, when the webbing 70 is pulled out toward the vehicle front side, the through anchor 10 tilts by about 45° toward the vehicle front side, with the webbing 70 extending from the insertion hole 26 of the through anchor 10 toward the vehicle front side. Accordingly, a dimension W of the webbing 70 sliding over the slide face 38 becomes a value of the width dimension of the webbing 70 multiplied by √2. To give an example, the width dimension of the webbing 70 is set-standard (under JIS) to be 46 mm or greater. When, allowing for dimensional tolerance, the width dimension of the webbing 70 is set to 47 mm, the dimension W of the webbing 70 would be about 66.27 mm. In such a case, the length L1 along the piece 30 length direction up to the upper end of the second slide face 42 of the piece 30 is set to for example 66.3 mm or greater, such that the webbing 70 slides reliably over the second slide face 42 even when the webbing 70 is pulled out toward the vehicle front.

As illustrated in FIG. 4, a vehicle compartment outside portion of the inner peripheral face 26A described above is inclined toward the plate 12 width direction outside (vehicle rear side) on progression from the vehicle compartment inside toward the vehicle compartment outside as viewed in cross-section from the vehicle upper side. Accordingly, configuration is made such that for example when the webbing 70 is being pulled toward the vehicle front as described above, an increase in the pulling force on the webbing 70 is suppressed even when a width direction edge portion of the webbing 70 contacts the inner peripheral face 26A.

Moreover, as illustrated in FIG. 2, at a boundary portion between the molded portion 50 and the piece 30, a groove portion 52 is formed. The groove portion 52 is formed with a substantially V-shaped cross-section profile, and one side face of the groove portion 52 is configured by the piece side inclined face 44. Namely, the groove portion 52 extends so as to be along the outer peripheral edge portion of the piece 30. The other side face of the groove portion 52 is configured by a covering portion side inclined face 54. The covering portion side inclined face 54 is configured by the molded portion 50. As illustrated in FIG. 1, as viewed in cross-section along a direction orthogonal to the groove portion 52 (the longitudinal direction of the groove portion 52), the covering portion side inclined face 54 is inclined such that an angle α3 formed between the covering portion side inclined face 54 and the face of the molded portion 50 adjacent to the covering portion side inclined face 54 is an oblique angle.

Explanation follows regarding a mold 60 with which the molded portion 50 is molded. The mold 60 is formed with a rib 62 that is for molding the groove portion 52 of the through anchor 10. The rib 62 is formed with a substantially V-shaped cross-section profile, and is configured including a first inclined face 64 and a second inclined face 66. In cross-section viewed as if looking at the plate 12 face on, an angle α4 formed between the plate 12 width direction and the first inclined face 64 is set smaller (more acute (less obtuse)) than the angle α2 formed between the slide face 38 and the piece side inclined face 44. An angle formed between the plate 12 width direction and the second inclined face 66 corresponds to (coincides with) the angle α3 of the covering portion side inclined face 54. During molding of the molded portion 50, an apex portion of the rib 62 of the mold 60 is disposed on (abuts) the piece side inclined face 44 of the piece 30. Note that in FIG. 1, as viewed in cross-section from inside the vehicle compartment, the groove portion 52 at the other length direction side (vehicle rear side) end portion of the piece 30 is illustrated, however the groove portion 52 is similarly configured at the one length direction side (vehicle front side) end portion of the piece 30.

Explanation follows regarding operation and advantageous effects of the present exemplary embodiment.

In the through anchor 10 configured as described above, the webbing 70 is inserted through the insertion hole 26 from the vehicle compartment outside, is entrained around the slide face 38 of the piece 30, and extends out from the insertion hole 26 toward the vehicle compartment inside. When an occupant pulls out the webbing 70, the webbing 70 is pulled out through the insertion hole 26 as it slides over the slide face 38.

For example, as illustrated in FIG. 10, when the occupant pulls the webbing 70 toward the vehicle front side, the through anchor 10 tilts by about 45° toward the vehicle front side, and the webbing 70 extends out from the insertion hole 26 of the through anchor 10 toward the vehicle front side. When this occurs, the width direction edge portion of the webbing 70 slides over the second slide face 42 of the piece side upright portion 32 even when the webbing 70 is displaced toward the vehicle front side.

Next, explanation follows regarding a manufacturing procedure of the through anchor 10. During manufacture of the through anchor 10, firstly the piece 30 is disposed inside the through hole 16 in order to assemble the piece 30 to the plate 12. In this state, the recessed fitting portion 34 of the piece 30 is disposed straddling the lower side portion of the plate 12, and the piece side upright portion 32 of the piece 30 is disposed in the through hole side upright portion 18 on the one width direction side (vehicle front side) of the plate 12 (see FIG. 9A). From this state, the piece 30 is moved toward the plate 12 width direction one side and toward the lower side, and the inner peripheral edge portion of the through hole 16 of the piece 30 is fitted inside the recessed fitting portion 34 (see FIG. 9B). The front face 12A and the back face 12B of the plate 12 are accordingly placed in close contact with the side faces 34A, 34B of the recessed fitting portion 34, and the inner peripheral face (the lower side inner peripheral face 20, the rounded corner face 24A, and the upright inner peripheral face 22A) of the through hole 16 of the plate 12 are placed in close contact with the top face 34C of the recessed fitting portion 34. Moreover, in this state, the hook portion 36A of the engagement claw 36 of the piece 30 engages with the lower side outer peripheral portion of the plate 12. The piece 30 and the plate 12 in their assembled state are set in the mold 60.

The piece 30 side side-face of the groove portion 52 of the through anchor 10 is configured by the piece side inclined face 44, and the piece side inclined face 44 is inclined such that the angle α2 formed between the piece side inclined face 44 and the slide face 38 of the piece 30 is an obtuse angle. When the mold 60 is closed (clamped), the apex portion of the rib 62 of the mold 60 is disposed on (abuts) the piece side inclined face 44 of the piece 30 (see FIG. 1). The movement of the piece 30 in the longitudinal direction is thereby suppressed by (the rib 62 of) the mold 60. In this state, the resin material for the molded portion 50 is injected into the mold 60, thus forming the molded portion 50 with the piece 30 being in a well-positioned state.

Since the apex portion of the rib 62 of the mold 60 can be disposed on the piece side inclined face 44, even supposing that burr were generated at the molded portion 50 after molding, any such burr would be disposed inside the groove portion 52. Any effects due to burr when the webbing 70 slides over the slide face 38 can accordingly be suppressed. Moreover, since the apex portion of the rib 62 of the mold 60 can be disposed on the piece side inclined face 44, the mold 60 can be suppressed from impinging on (interfering with) the slide face 38. The occurrence of scratches or dents to the slide face 38 can accordingly be suppressed.

The molded portion 50 side side-face of the groove portion 52 configures the covering portion side inclined face 54. The covering portion side inclined face 54 is inclined such that as viewed in cross-section orthogonal to the groove portion 52, the angle α3 formed between the covering portion side inclined face 54 and the face of the molded portion 50 is an obtuse angle. Sliding resistance with respect to the webbing 70 can accordingly be reduced in comparison to in a case in which the covering portion side inclined face 54 were formed with the angle α3 at 90°.

Note that in the present exemplary embodiment, the angle α4 formed by the first inclined face 64 of the rib 62 of the mold 60 is set more acute than the angle α2 formed by the piece side inclined face 44, however the angle α4 of the first inclined face 64 may be set the same as the angle α2 of the piece side inclined face 44.

In the present exemplary embodiment, the length direction one end portion of the piece 30 is formed with the piece side upright portion 32, however the piece side upright portion 32 may be omitted from the piece 30. That is to say, the piece 30 may be formed in a columnar shape substantially with an inverted U-shaped cross-section profile and the second slide face 42 may be omitted.

Figure 11:
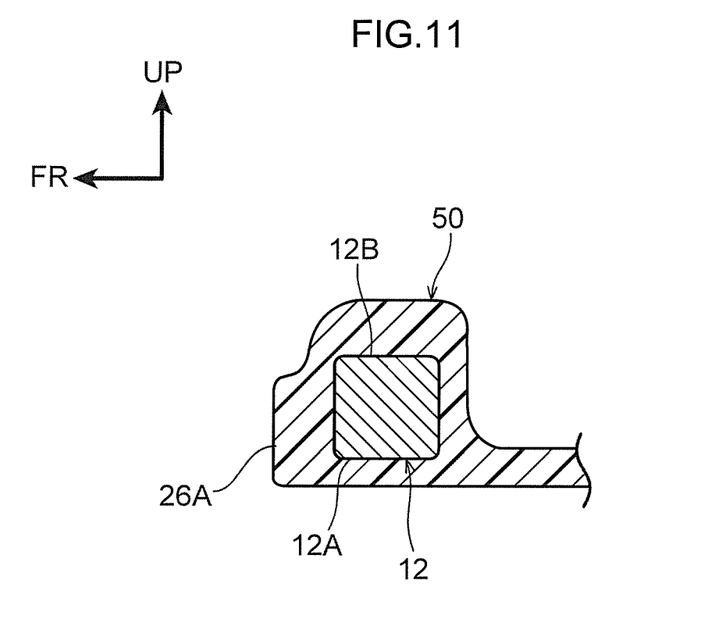
FIG. 11 is a cross-section illustrating another example of an inner peripheral face of the through anchor shown in FIG. 4, as viewed from the upper side.

Moreover, in the present exemplary embodiment, the vehicle compartment outside portion of the inner peripheral face 26A of the insertion hole 26 is inclined toward the plate 12 width direction outside (vehicle rear side) on progression from the vehicle compartment inside toward the vehicle compartment outside as viewed in cross-section from the vehicle upper side. Alternatively, as illustrated in FIG. 11, the vehicle compartment outside portion of the inner peripheral face 26A may be formed with a notched substantially rectangular shaped cross-section.

What is claimed is:

1. A through anchor comprising:
   a main body portion that is manufactured from metal, and at which a through hole, which is for forming an insertion hole through which a webbing that restrains an occupant is inserted, is formed;
   a piece that is assembled to the main body portion so as to cover a portion of an inner peripheral edge portion of the through hole, and whose face configures a slide contact portion that makes sliding contact with the webbing;
   a covering portion that is formed by molding integrally with the piece and the main body portion with the slide contact portion being in an exposed state, that covers another portion of the inner peripheral edge portion of the through hole, and that configures an inner peripheral portion of the insertion hole together with the piece;
   a groove portion that is formed at a boundary portion between the piece and the covering portion;
   a piece side inclined face that configures a side face of the groove portion at a piece side, with an angle formed between the piece side inclined face and the slide contact portion being set as an obtuse angle as viewed in a cross-section orthogonal to the groove portion, and
   a covering portion side inclined face that configures a side face of the groove portion at a covering portion side, with an angle formed between the covering portion side inclined face and a face of the covering portion being set as an obtuse angle as viewed in the cross-section orthogonal to the groove portion,
   wherein, as viewed in a cross-section orthogonal to the groove portion, a length of the piece side inclined face is longer than a length of the covering portion side inclined face, and an angle $\alpha 2$ formed between the piece side inclined face and the slide contact portion is larger than an angle $\alpha 3$ formed between the covering portion side inclined face and the face of the covering portion, the face being adjacent to the covering portion side inclined face.

2. The through anchor of claim 1, wherein the covering portion covers the another portion of the inner peripheral edge portion of the through hole, the another portion being other than a portion of the inner peripheral edge portion of the through hole where the piece is provided.

3. The through anchor of claim 1, wherein the covering portion covers the another portion of the inner peripheral edge portion of the through hole, the another portion being other than a portion of the inner peripheral edge portion of the through hole where the piece is provided.

4. The through anchor of claim 1, wherein the groove portions are formed respectively at both end portions of the piece in a longitudinal direction of the piece.

5. The through anchor of claim 1, wherein the groove portions are formed respectively at both end portions of the piece in a longitudinal direction of the piece.

6. The through anchor of claim 1, wherein the piece is a resin piece having a resin face that configures substantially all of the slide contact portion that makes sliding contact with the webbing.

7. A through anchor comprising:
   a main body portion that is manufactured from metal, and at which a through hole, which is for forming an insertion hole through which a webbing that restrains an occupant is inserted, is formed;
   a resin piece that is assembled to the main body portion so as to cover a portion of an inner peripheral edge portion of the through hole, having a resin face that configures substantially all of a slide contact portion that makes sliding contact with the webbing;
   a covering portion that is formed by molding integrally with the resin piece and the main body portion with the slide contact portion being in an exposed state, that covers another portion of the inner peripheral edge portion of the through hole, and that configures an inner peripheral portion of the insertion hole together with the resin piece;
   a groove portion that is formed at a boundary portion between an end of the resin piece and the covering portion; and
   a piece side inclined face that configures a side face of the groove portion at a piece side, with an angle formed between the piece side inclined face and the slide contact portion being set as a first obtuse angle as viewed in a cross-section orthogonal to the groove portion, and
   a covering portion side inclined face that configures a side face of the groove portion at a covering portion side, with an angle formed between the covering portion side inclined face and a face of the covering portion being set as a second obtuse angle as viewed in the cross-section orthogonal to the groove portion,
   wherein the first and second obtuse angle are unequal.

* * * * *